(12) United States Patent
Akiyama et al.

(10) Patent No.: US 6,604,826 B2
(45) Date of Patent: Aug. 12, 2003

(54) METHOD FOR EVALUATING AN OCULAR OPTICAL LENS AND APPARATUS AND MEMORY MEDIUM THEREFOR

(75) Inventors: Hisanori Akiyama, Shinjyuku-ku (JP); Hua Qi, Shinjyuku-ku (JP); Norihisa Tanaka, Shinjyuku-ku (JP); Toshiro Yoda, Shinjyuku-ku (JP)

(73) Assignee: Hoya Corporation, Tokyo (JP)

( * ) Notice: Subject to any disclaimer, the term of this patent is extended or adjusted under 35 U.S.C. 154(b) by 87 days.

(21) Appl. No.: 09/977,336

(22) Filed: Oct. 16, 2001

(65) Prior Publication Data

US 2002/0071096 A1 Jun. 13, 2002

(30) Foreign Application Priority Data

Oct. 17, 2000 (JP) .................................. 2000-316914

(51) Int. Cl.[7] ............................................... A61M 3/10
(52) U.S. Cl. ..................................................... 351/216
(58) Field of Search ................................. 351/205, 216, 351/159, 168, 169; 359/642, 643, 743; 356/402, 403, 425

(56) References Cited

U.S. PATENT DOCUMENTS

| | | | |
|---|---|---|---|
| 4,606,626 A | 8/1986 | Shinohara | |
| 4,790,637 A | 12/1988 | Mercado et al. | |
| 4,838,675 A | * 6/1989 | Barkan et al. | ............... 351/169 |
| 6,070,980 A | 6/2000 | Obara et al. | |
| 6,118,597 A | 9/2000 | Maruyama | |

FOREIGN PATENT DOCUMENTS

| | | |
|---|---|---|
| EP | 0 734 683 A2 | 10/1996 |
| EP | 0 734 683 A3 | 6/1997 |
| EP | 0 790 605 A2 | 8/1997 |
| JP | 08-266472 A | 10/1996 |

OTHER PUBLICATIONS

International Organization for Standardization (1996), Draft International Standard ISO/DIS 13666, Ophthalmic Optics—Spectacle Lenses—Vocabulary, pp. 1–35 and Index pp. I–VII.
European Search Report dated Dec. 2, 2002 for EP Application No. EP 01 12 2023.

* cited by examiner

*Primary Examiner*—George Manuel
(74) *Attorney, Agent, or Firm*—Griffin & Szipl, P.C.

(57) ABSTRACT

An apparatus and method for displaying a difference in the Abbe number of an ocular optical lens to facilitate visual appreciation and understanding of the difference by a layperson. The apparatus and method indicates a degree of chromatic aberration at each point of a spectacle lens by inputting data corresponding to an Abbe number and outputting a representation of a region of comfortable vision. A plurality of the data may be obtained using a plurality of spectacle lenses having different Abbe numbers. On a single screen, the invention displays an image of the shape of a spectacle frame, a plurality of regions of comfortable vision (as a circle, ellipse or another closed curve, for example) and the difference in vision due to the difference in the Abbe number is evaluated from the display.

18 Claims, 5 Drawing Sheets

(2 of 5 Drawing Sheet(s) Filed in Color)

METHOD FOR EVALUATING AN OCULAR OPTICAL LENS AND APPARATUS AND MEMORY MEDIUM THEREFOR

FIELD OF THE INVENTION

The present invention relates to a method for evaluating an ocular optical lens and an apparatus and a memory medium therefor and, more particularly, to a method for evaluating an ocular optical lens comprising visualizing an Abbe number of an ocular optical lens in the form of a region of comfortable vision displayed on a video screen and an apparatus and a memory medium therefor.

BACKGROUND OF THE INVENTION

The desired properties for a lens material used to make spectacles include a high refractive index, a high Abbe number, a low specific gravity, excellent workability, excellent tinting performance and chemical resistance. Among these properties, the refractive index and the Abbe number are particularly important optical properties.

With respect to a spectacle lens having a great dioptric power, the higher the refractive index of the lens, the smaller the thickness required. Aesthetically, thinner lenses have better appearance and are lighter in weight. With respect to the Abbe number, the higher the Abbe number of the lens the smaller the chromatic aberration in peripheral portions of the lens, which corresponds to a greater lens area affording comfortable vision for the user.

Historically, it had been difficult to produce an ideal lens material having both a high refractive index and a high Abbe number. Typically, a spectacle lens having a higher refractive index tended to have a lower Abbe number. However, as eyeglass lens production technology progressed, materials having a high refractive index, a high Abbe number, and suited for making spectacle lenses have been developed. Spectacle lenses prepared using these new materials have excellent optical properties and are now becoming commercially available.

Generally speaking, a difference in the refractive index of a spectacle lens manifests itself as a difference in the external shape (i.e. the thickness) of the lens when spectacle lenses of the same dioptric power are compared. Therefore, differences in the refractive index between eyeglasses can be easily appreciated by a person wearing spectacles. However, a difference in the Abbe number of a spectacle lens is less apparent because the difference cannot be seen as a difference in the external shape of the glasses. Consequently, lenses having different Abbe numbers cannot be easily appreciated by a customer wishing to buy a pair of spectacles. To help the customer understand the effect of the Abbe number on the spectacle lenses several methods have evolved. For example, the Snellen's visual mark is one technique utilizing a pattern of "E"s for exhibiting an actual visual image based on the Abbe number used for simulating optical lens effects (i.e. visual acuity) on a retinal image. The image of actual vision produced by this technique causes the peripheral portions of the image to be blurred due to the unfocused colors of the visible spectrum. The degree of the peripheral blur depends on the Abbe number.

It is desired by optometrists and professionals who sell spectacles, or eyeglasses, that customers be able to readily appreciate how a difference in a lens's Abbe number can correspond to a difference in actual vision because an educated consumer is a more satisfied customer. Specifically, when the customer can appreciate immediately the superior actual vision provided by spectacles made using the newer excellent lens material and having a high Abbe number, then the excellent spectacle lenses can be immediately recognized as distinguished products different from ordinary spectacle lenses.

Unfortunately, differences in the Abbe number of lenses remain difficult for a layperson to recognize. For the image of actual vision described above, blur due to slightly unfocussed colors appearing in the Snellen's visual mark is similar to that appearing in the actual retinal image. Therefore, it is mostly professional persons skilled in the art who are able to recognize and appreciate the affect differences in the Abbe number have on an eyeglass lens. Ordinary people who will wear the spectacles may not be aware of the blurring of their peripheral visual fields.

SUMMARY OF THE INVENTION

The present invention is directed to providing a method for facilitating the evaluation of an ocular optical lens which overcomes the above problems by displaying the difference in the Abbe number of an ocular optical lens as a difference in the area of a region thereby making plain the visually recognizable difference affected by the Abbe number and an apparatus and a memory medium used therefor.

The present invention provides, in a first preferred embodiment, a method for evaluating an ocular optical lens which comprises: inputting a value of an Abbe number expressing a degree of chromatic aberration at each point on an ocular optical lens; obtaining a region of comfortable vision based on the input values, the region of comfortable vision being a region in which a specific value of visual acuity is surely obtained; and evaluating a difference in visibility due to a difference in the Abbe number of the ocular optical lens based on an area of the region of comfortable vision. The area of the region of comfortable vision may be expressed as a number or understood from an area of the region displayed on a screen. In accordance with the present embodiment, the difference in the visual acuity due to the difference in the Abbe number is recognized not as a retinal image but as the region of comfortable vision in which a specific value of visual acuity is surely obtained. Therefore, the difference in visual acuity due to the difference in the Abbe number can be directly recognized by comparing regions of comfortable vision.

In a second preferred embodiment, the present invention provides a method for evaluating an ocular optical lens according to the first preferred embodiment, wherein the region of comfortable vision is displayed as an image.

In a third preferred embodiment, the present invention provides a method for evaluating an ocular optical lens according to first and second preferred embodiments, wherein the region of comfortable vision is a region marked out with and contained in a circle, an ellipse or a closed curve.

In a fourth preferred embodiment, the present invention provides a method for evaluating an ocular optical lens according to the first three preferred embodiments, wherein a plurality of regions of comfortable vision are obtained from Abbe numbers of a plurality of ocular optical lenses based on different specifications and displayed on a single screen so that the plurality of regions can be compared. When a plurality of the regions of comfortable vision are exhibited on the same screen as overlapping images, the comparison can be made easily and the difference in the vision experienced by the lens wearer due to the difference in the Abbe number can be directly recognized.

In a fifth preferred embodiment, the present invention provides a method for evaluating an ocular optical lens according to any one of the first four embodiments, wherein the region of comfortable vision is displayed on a screen with the center of the region placed at an optical center of the ocular optical lens being evaluated, and an image in the shape of a lens frame is also displayed on the same screen.

In a sixth preferred embodiment, the present invention provides a method for evaluating an ocular optical lens according to any one of the first five embodiments, but enables simulation of a change in the region of comfortable vision resulting from altering at least one of the Abbe number, a value of visual acuity, a spherical dioptric power, a cylindrical dioptric power, an angle of cylinder axis, an additional dioptric power, and values of IN/OUT and UP/DOWN coordinates that map out a layout of a lens shape. The additional dioptric power is a datum related to a progressive multifocal lens.

In a seventh preferred embodiment, the present invention provides a method for evaluating an ocular optical lens according to the methods of the first six embodiments, wherein an image of actual vision corresponding to the region of comfortable vision is created based on the Abbe number used for obtaining the region of comfortable vision and the image of actual vision and the region of comfortable vision are displayed on the same screen so that the image and the region can be visually compared.

In an eighth preferred embodiment, the present invention provides a method for evaluating an ocular optical lens according to the methods of the first seven embodiments, wherein a Landolt's ring or a Snellen's visual mark is used to create the image of actual vision.

In a ninth preferred embodiment, the present invention provides a method for evaluating an ocular optical lens which comprises: arbitrarily selecting a point inside a lens shape of one ocular optical lens and, based on prism characteristics at the selected point, obtaining an equivalent visual region in which a specific value of visual acuity is surely obtained; obtaining an equivalent visual region of an other ocular optical lens in accordance with a same method; and displaying the two equivalent visual regions on a same screen in a manner such that the regions can be compared. The equivalent visual region is a visual region obtained from the prism characteristics and the Abbe number at the point arbitrarily selected as described above and is different from the region of comfortable vision which was obtained in a manner such that the specific value of visual acuity is surely obtained at each point of the ocular optical lens. The arbitrarily selected point may be a single point or a plurality of points.

In a tenth preferred embodiment, the present invention provides a method for evaluating an ocular optical lens according to the ninth embodiment, wherein an image of actual vision at the selected point is created and the image of actual vision and the equivalent visual region are displayed on the same screen so that the image and the region can be compared.

In an eleventh preferred embodiment, the present invention provides an apparatus for evaluating an ocular optical lens which comprises: means of input for inputting data of an optical system including an Abbe number, a lens dioptric power and a value of visual acuity and a lens shape of the ocular optical lens; means of calculation for obtaining a region of comfortable vision in which the value of visual acuity can be surely obtained based on the data input via the means of input; and means of display for displaying the region of comfortable vision obtained by the means of calculation and the lens shape on the same screen so that the region and the lens shape can be compared.

In a twelfth preferred embodiment, the present invention provides an apparatus for evaluating an ocular optical lens according to the eleventh embodiment, wherein the region of comfortable vision is marked out with and contained in a circle whose center is placed at an optical center of the ocular optical lens and whose radius has a value h in a following range:

$$h \leq k v_e / |D|$$

wherein the following are defined as:
k: a constant
$v_e$: an Abbe number
D: a lens dioptric power.

In a thirteenth embodiment, the present invention provides an apparatus for evaluating an ocular optical lens according to the eleventh and twelfth embodiments, but also includes: an apparatus for measuring an Abbe number which is used for measuring the Abbe number of the ocular optical lens; a lens meter for measuring a lens dioptric power of the ocular optical lens; a frame tracer for obtaining a shape of a lens frame; means of external input for inputting data obtained by the measurements using the apparatus for measuring an Abbe number, the lens meter and the frame tracer into the means of calculation; and means of manual input for inputting desired data of an optical system including the Abbe number into the means of calculation.

In a fourteenth preferred embodiment, the present invention provides a memory medium readable by a computer and storing a program for operating a computer, the program comprising: means for entering and processing data of an optical system of an ocular optical lens; means for generating a region of comfortable vision in which a specific value of visual acuity is surely obtained based on the data of an optical system; and means for displaying the obtained region of comfortable vision.

In accordance with the embodiments of the present invention, differences in vision due to the difference in the Abbe number of a lens is expressed as the area of the region of comfortable vision in which a specific value of visual acuity can be surely obtained. Thus, the Abbe number or the difference in the Abbe number which has previously been difficult for laypeople to appreciate can easily be recognized.

Further objects, features and advantages of the present invention will become apparent from the Detailed Description of Preferred Embodiments, which follows, when considered together with the attached Drawings.

BRIEF DESCRIPTION OF DRAWINGS

The patent or application file contains at least one drawing executed in color. Copies of this patent or patent application publication with color drawing(s) will be provided by the Office upon request and payment of the necessary fee

DETAILED DESCRIPTION OF THE PREFERRED EMBODIMENTS OF THE INVENTION

Figure 4:
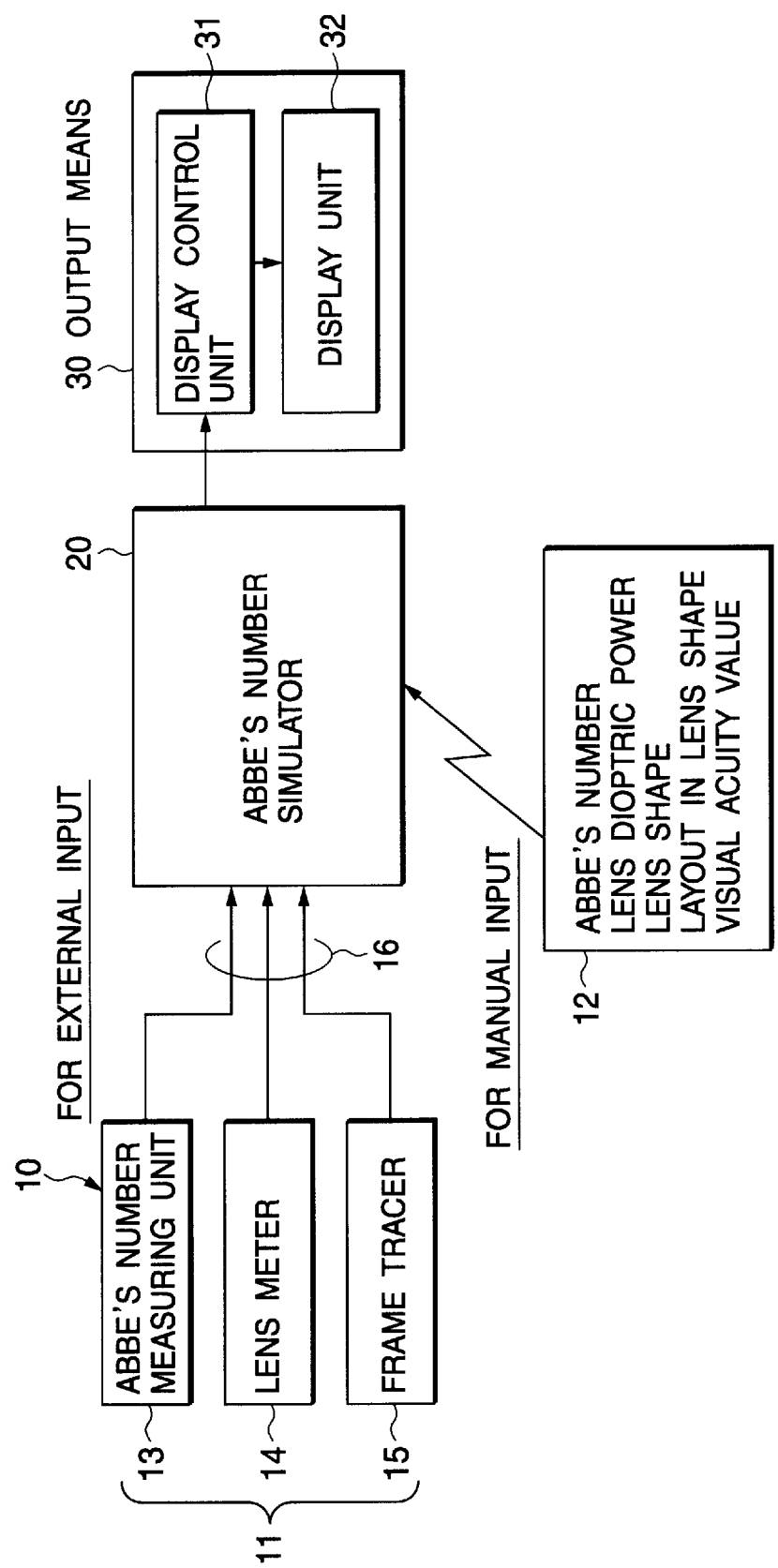
FIG. 4 shows a block diagram describing the apparatus for evaluation of an ocular optical lens of an embodiment of the present invention.

The preferred embodiments of the present invention are described. FIG. 4 shows a block diagram describing the apparatus for evaluating a spectacle lens, which is an ocular optical lens. The apparatus includes an input 10 for inputting data corresponding to the optics of a spectacle lens. The data is used for determining a corresponding region of comfortable vision resulting from the input parameters. The region of comfortable vision is a visual field area in which a specific value of visual acuity is surely obtained as determined by input data, such as an Abbe number. More specifically, the region of comfortable vision is the region defined by the spectacle lens such that the specific preferred value of visual acuity can be surely obtained within the region. Or, simply said, the region of comfortable vision is the portion of the lens that provides comfortable vision to a person wearing the lens. The Abbe number is the main determinant affecting the size of the region of comfortable vision, although it is not the only parameter to consider.

Consequently, the apparatus for evaluating a spectacle lens includes an Abbe number simulator 20 for determining the region of comfortable vision of the spectacle lens by means of calculation based on the data describing the optical system, such as the Abbe number. The apparatus also has an output 30 for outputting results corresponding to the region of comfortable vision determined or calculated by the Abbe number simulator.

The Abbe number simulator is created so that data corresponding to the region of comfortable vision and data corresponding to an image of actual vision provided by the lens can be outputted. The output, which is determined based on data including an Abbe number corresponding to the optical system being evaluated, is produced using a simulation program which will be described later. The image of actual vision is the image simulating a retinal image as would be known by one of ordinary skill in the art and as described elsewhere (for example, Japanese Patent Application Laid-Open No. Heisei 8(1996)-266472 corresponding to U.S. Pat. No. 5,677,750, in corporated hereto by reference). In practice of the invention, the Abbe number simulator 20 is a personal computer or other electronic computational device.

The input 10 comprises two input lines. One of the input lines is an external input 11 and the other is manual input 12. Any of these input lines can be selected for inputting data. The external input 11 enters outputs from an Abbe number measuring apparatus 13, a lens meter 14 and a frame tracer 15 into the Abbe number simulator 20. The Abbe number measuring apparatus measures the Abbe number of a lens. External data collected by the Abbe number measuring apparatus 13, lens meter 14, and frame tracer 15 is entered into the Abbe number simulator 20 via the external input 11 by using a communication cable 16, such as, for example, an RS232C cable.

The manual input 12 may be without limitation, for example, any one of a variety of commercially available data input apparatuses such as a keyboard, a mouse, a trackball, a trackpad, an apparatus for pen input and a pointing device. Data such as the Abbe number, the dioptric power and the shape of a spectacle lens can be manually input into the Abbe number simulator using the above manual input.

The output 30 includes an apparatus for controlling display, being display control unit 31, and a display apparatus or unit 32 controlled by the apparatus for controlling display 31. The display unit 32 can be without limitation, for example, any one of many devices such as a CRT, a liquid crystal display, a printer and a plotter. The region of comfortable vision can be displayed on the display unit 32 based on the data corresponding to the region of comfortable vision output produced by the Abbe number simulator 20.

Among the apparatuses connected to the Abbe number simulator 20, the apparatus 13 for measuring the Abbe number obtains an Abbe number, which is the reverse of a dispersive power, by measuring the Abbe number from the lens being evaluated. When an e-ray is used as the reference ray, the Abbe number $v_e$ can be obtained in accordance with the following equation:

$$V_e = (n_e - 1)/(n_{F'} - n_{C'}) \quad (1)$$

In the above equation, $v_e$ represents the refractive index of a medium with respect to the e-ray (Hg), $n_{,}$ represents the refractive index of the medium with respect to the F'-ray (Cd) and $n_{C'}$, represents the refractive index of the medium with respect to the C'-ray (Cd).

The lens meter 14 measures the following data of an optical system: the spherical dioptric power, the cylindrical dioptric power, the angle of the cylindrical axis, and the additional dioptric power of a spectacle lens inserted into the optical system. The lens meter 14 outputs the measurement data output to the Abbe number simulator 20 via communication cable 16. Preferably, lens meter 14 is automated to conveniently measure the desired parameters as is known and commercially available in the art.

The frame tracer 15 is used to manually trace the outline of a held spectacle frame being considered. The frame tracer 15 automatically obtains data corresponding to the lens shape while the tracing is performed, and outputs the trace data to the Abbe number simulator 20 via communication cable 16. Tracers that may be used to practice the invention are known and commercially available.

Figure 5:
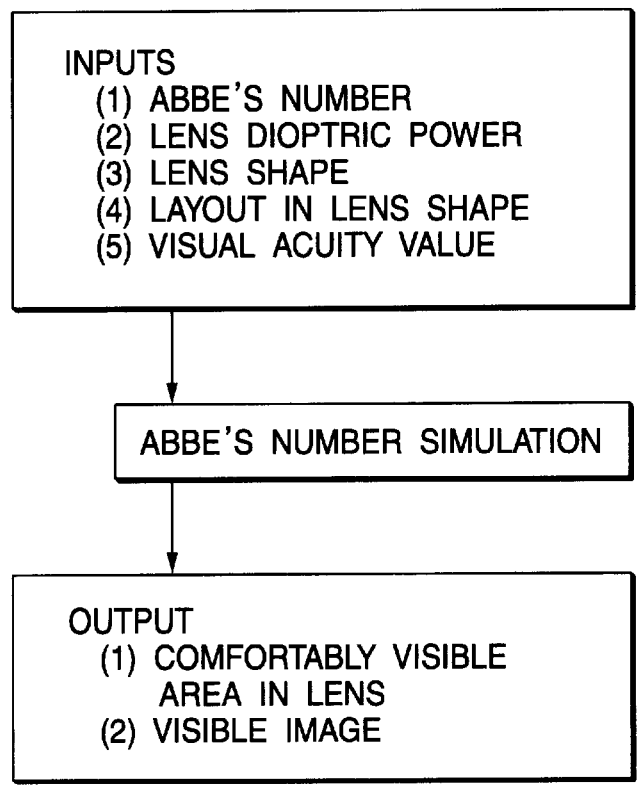
FIG. 5 shows a diagram describing the steps of simulation of an ocular optical lens of an embodiment of the present invention.

In the apparatus for evaluating an ocular optical lens as described above, FIG. 5 summarizes the input data corresponding to an optical system being evaluated and to a lens shape being considered. The input data listed as (1) to (5) in FIG. 5 are successively entered into the Abbe number simulator 20 using the input 10. Once the input data has been entered, the Abbe number simulator 20 conducts a simulation based upon the input data.

The input data is used to calculate the simulation and is defined as follows:

(1) Abbe number ($v_e$)
   $V_e$ represents the Abbe number with respect to the e-ray.
(2) Lens dioptric power (S, C, Ax, Px, Py and ADD)
   S represents the spherical dioptric power, C represents the cylindrical power, Ax represents the angle of the cylindrical axis, Px represents the prism dioptric power in the vertical direction and ADD represents the additional dioptric power.

(3) Lens shape

The lens shape provides the data for the outline of the spectacle frame.

(4) Layout of lens shape (IN/OUT and UP/DOWN)

The layout of the lens shape is the displacement between the geometrical center and the optical center of the lens shape. IN/OUT represents the displacement in the direction of the X-axis of the lens. UP/DOWN represents the displacement in the direction of the Y-axis of the lens.

(5) Visual acuity value

The visual acuity value indicates a condition of vision. For spectacle lenses, it is recommended and desired that a visual acuity of 0.7 or greater be obtained.

The Abbe number simulator 20 externally receives various data, corresponding to the optical system being evaluated, from the apparatus for measuring the Abbe number 13, the lens meter 14 and the frame tracer 15 described above via communication cables 16. The data can be modified on a display screen operated by a simulation program which will be described later. The Abbe number simulator 20 may also receive various data corresponding to an optical system via input manually entered by manual input 12. In practice, the manually entered data, corresponding to an optical system to be evaluated, are entered into the Abbe number simulator 20 via the manual input 12, such as, for example, a keyboard.

The Abbe number simulator 20 performs the simulation operation in FIG. 5, which is described later. The result of the simulation is that (1) output data corresponding to, and outlining the borders of, the region of comfortable vision on the lens and (2) output data corresponding to the image of actual vision are produced.

The data obtained above are electronically transferred to the output 30 from the Abbe number simulator 20 via means that are conventionally known. The apparatus or unit for controlling display 31, which is a part of output 30, controls the display of (i) the region of comfortable vision corresponding to the actual lens being evaluated and (ii) the image of actual vision, both of which are displayed on the screen of display unit 32. The image of actual vision displayed on the screen of the display apparatus 32 is an image showing the effect of the chromatic aberration actually formed based upon the inputted data. The region of comfortable vision is an image created and displayed with the center of the image placed to correspond to the optical center the lens being evaluated. The image of actual vision is a simulated retinal image obtained as follows: using data corresponding to the optical system being evaluated, at a plurality of wavelengths which are set in advance, simulated monochromatic retinal images at the plurality of wavelengths are formed from calculations based upon data corresponding to an original image, then the simulated retinal image is created from the obtained simulated monochromatic retinal images.

As previously discussed, methods for determining the image of actual vision are already known. However, the method for obtaining a region of comfortable vision will be described below.

The Abbe number and the chromatic aberration used in the calculation performed by the Abbe number simulator 20 will be described below.

A. Abbe Number and Chromatic Difference in the Angle of Deviation

The refractive index $n(\lambda)$ at an arbitrary wavelength $\lambda$ is calculated from the refractive index $n_e$ with respect to the e-ray and the Abbe number $v_e$, according to the following equation (2):

$$n(\lambda)=1+(n_e-1)\{1+B(\lambda)+A(\lambda)/v_e\} \quad (2)$$

In the above equation, $$\delta(\lambda) = \{n(\lambda) - 1\}i \quad (6)$$
$$= (n_e - 1)i\{1 + B(\lambda) + A(\lambda)/v_e\}$$
$$= (P/100)\{1 + B(\lambda) + A(\lambda)/v_e\}$$

Since the Abbe number is defined as:

$$V_e=(n_e-1)/(n_{F'}-n_{C'}) \quad (4)$$

the following relations hold:

$$B(F')=B(C'), A(F')-A(C')=1 \quad (5)$$

Figure 6:
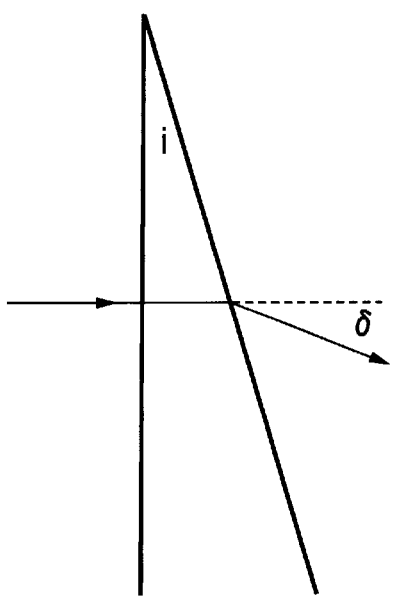
FIG. 6 shows a diagram describing the angle of deviation of a ray by a prism having an angle of i.

The angle of deviation of a normal ray refracted by the prism having the angle of i shown in FIG. 6 is:

$$A(\lambda) = -1.4955487241077 + 0.0885672084113\,\lambda^2 + \quad (3)$$
$$0.3649396625563 / (\lambda^2 - 0.035) +$$
$$0.0057200161544 / (\lambda^2 - 0.035)^2$$

$$B(\lambda) = 0.0008271206802 - 0.0070364882344\lambda^2 +$$
$$0.0011576188189 / (\lambda^2 - 0.035) -$$
$$0.0002166266192\,(\lambda^2 - 0.035)^2$$

The difference in the angle of deviation between the F'-ray and the C'-ray is expressed as:

$$\Delta\delta = \delta(F') - \delta(C') \quad (7)$$
$$= (P/100)[B(F') - B(C') + \{A(F') - A(C')\}/v_e]$$
$$= (0.01P)/v_e$$

B. Chromatic Difference in Angle of Deviation and Visual Acuity

When the chromatic difference in the angle of deviation $\Delta\delta$ obtained in accordance with the equation (7) increases, blur in the color spectrum increases and the visual acuity decreases. The empirical equation describing the relation between the chromatic difference in the angle of deviation $\Delta\delta$ and the visual acuity value Va is as follows:

$$Va=0.001389/\Delta\delta=0.1389v_e/P \quad (8)$$

Wherein: P is the prism diopter.

For example, to obtain a value of visual acuity of 0.7 or greater, the prism diopter P, which is the unit used for expressing the ability of the prism to refract light in the direction of polarized light, is in the range of:

$$P \leq 0.1389 v_e/0.7 = 0.19844 v_e \quad (9)$$

When the lens dioptric power D is decided, the following relation is obtained:

$$|D|h/10 \leq 0.19844 v_e \quad (10)$$

In the above equation, h represents the radius of the circle of the region of comfortable vision in which a value of visual acuity of 0.7 or greater can be surely obtained. Therefore, the radius h of the circle placed within the range of the lens shape and having the center placed at the optical center is:

$$h \leq 1.9844 v_e/|D| \quad (1)$$

When specific values are inputted into the above equation, the following results are obtained.

When D=−6, the radius of the region of the lens in which a value of visual acuity of 0.7 or greater can be surely obtained is as follows:

When $v_e$=58, 19.2 mm or Φ 38.4
When $v_e$=42, 13.9 mm or Φ 27.8
When $v_e$=38, 12.6 mm or Φ 25.2
When $v_e$=31, 10.2 mm or Φ 20.4

The above simulation program performed by the Abbe number simulator 20 is memorized or stored in a medium. Known and commercially available mediums that can be used to store the simulation program include, for example, a flexible disk, a CD-ROM or a memory card. The simulation program stored in the medium is installed into a memory apparatus, such as a hard disk apparatus, disposed and incorporated in the Abbe number simulator 20.

When the simulation program runs, the decrease in visibility due to chromatic aberration is calculated at each point corresponding to a spectacle lens undergoing evaluation. The region of comfortable vision is obtained based on the calculated result. Differences in visibility due to differences in the Abbe number of the spectacle lens is evaluated based on the size and shape of the area of the region of comfortable vision. The simulation program contributes to the operation and construction of the above apparatus for evaluation of an ocular optical lens as described above.

Figure 1:
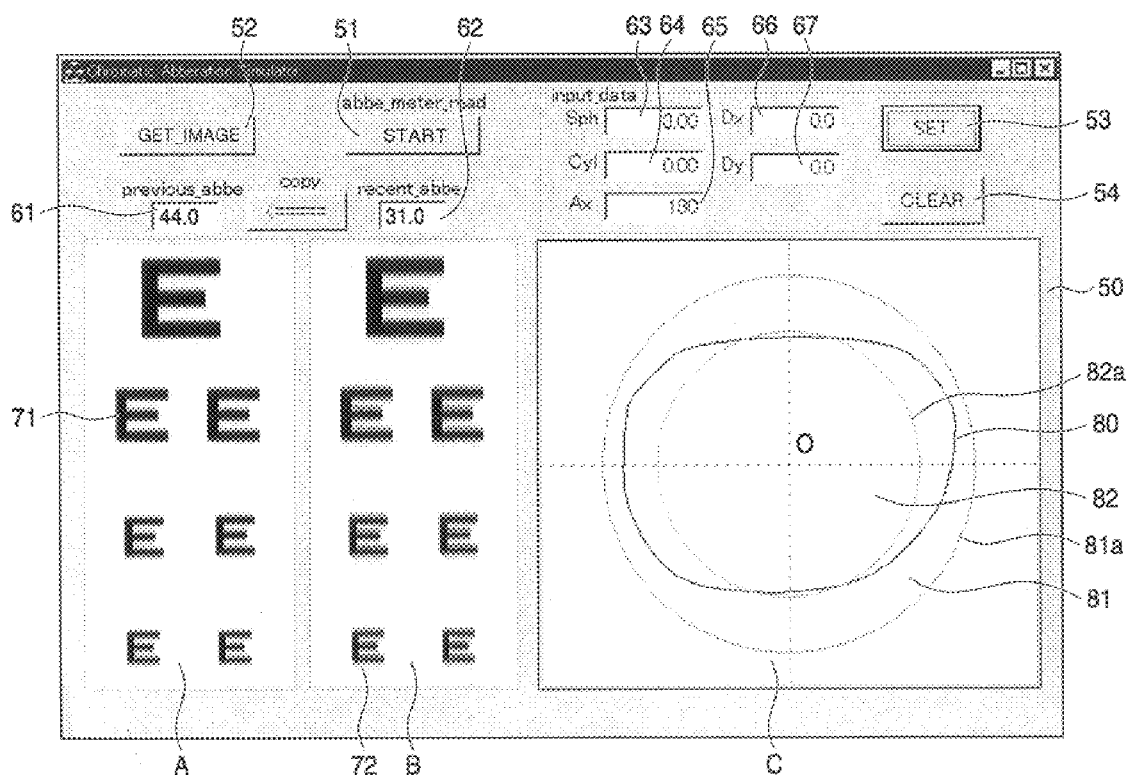
FIG. 1 shows a screen display when the Abbe numbers treated by the apparatus for evaluation of an ocular optical lens in accordance with an embodiment of the present invention are different to a great degree.

FIG. 1 provides an example of what the region of comfortable vision would look like when displayed on the screen of a display apparatus or unit 32 based on output data provided by the Abbe number simulator 20. Windows 61 and 62 respectively display previous and recent Abbe numbers. An image 80 in the shape of a spectacle frame is displayed as well as two regions of comfortable vision 81 and 82 corresponding to two different Abbe numbers. The image 80 and the two regions of comfortable vision 81 and 82 are displayed and visually compared on a single screen. FIG. 1 provides just an example of how the output data could be displayed. Certainly, the display format can be changed in various manners without departing from the spirit of the invention.

Other information can be shown on the display screen as demonstrated in FIG. 1. For example, a START button 51 can be displayed on the screen window 50. When this screen "button" is operationally engaged or "clicked" as it is known in the art, the Abbe number simulator is connected to the apparatus 13 for measuring the Abbe number, the lens meter 14 and the frame tracer 15. The data corresponding to the optical system of a spectacle lens to be evaluated are entered into the Abbe number simulator via these apparatuses 13, 14 and 15 and the entered data are displayed on the data display windows 61 to 67.

The Previous_Abbe window 61 displays the Abbe number inputted by the apparatus 13, or manually inputted by the means for manual input 12, before a change in the Abbe number is evaluated. The previous Abbe number is displayed for comparison with a subsequently inputted Abbe number representing a change. In the Recent_Abbe window 62, the Abbe number representing a change is displayed. When the apparatus for evaluating an ocular optical lens is in operation, Abbe numbers corresponding to different lenses can be compared.

In the Sph window 63, spherical dioptric power input data is displayed. In the Cyl window 64, cylindrical dioptric power input data is displayed. In the Ax window 65, the angle of cylindrical axis input data is displayed. In the Dx window 66, the X value of the prism characteristics of the lens input data is displayed. In Dy window 67, the Y value of the prism characteristics of the lens input data is displayed. In the example shown in FIG. 1, the value in the Cyl window is zero, which corresponds to the absence of astigmatism. The values in the Dx window 66 and the Dy window 67 are both zero, which means that the spectacle lens undergoing evaluation has no correction with respect to these values of the prism characteristics. The previous and recent Abbe numbers which are compared are 44.0 and 31.0 respectively, and the difference in the Abbe number is relatively great (i.e., 13.0).

To fix, or set, the data entered into the Abbe number simulator 20 and displayed in the windows 61 to 67, a SET button 53 is provided. To fix or set the entered data, the SET button 53 is clicked. To clear these data, a CLEAR button 54 is clicked. When the data are manually inputted by the means for manual input 12, the data are inputted directly into the data display windows 61 to 67 without clicking the START button 51. However, the SET button 53 must be clicked to set the data as described when data is entered by the means for external input 11.

Once the data are fixed, the calculation of the simulation is conducted automatically based on the data that is set. For the calculation, the simulation sets the value of visual acuity at 0.7, which is the minimum desired visual acuity. Based on the result of the simulation calculation performed by the Abbe number simulator 20, Snellen's E mark, being images of actual vision 72, are displayed with blurred outlines in the right portion B of the left area of the screen window 50. The images of actual vision 72 are simulated retinal images created from the simulated images of the F-ray, the e-ray and the C-ray. As shown in FIG. 1, the positions of the retinal images of the F-ray (blue), the e-ray (yellowish green) and the C-ray (red) are displaced from each other. The displacement between the colors depends on the Abbe number. Therefore, when spectacle lenses having different Abbe numbers are used, the displacement between colors due to the chromatic aberration becomes different.

Corresponding to the image of actual vision 72 described above, the region of comfortable vision 82 obtained by the calculation performed by the Abbe number simulator is displayed in the right area of the screen as the area of the region marked out with and contained in a circle, an ellipse or a closed curve whose center is placed at the optical center O of an image of a shape of a spectacle frame 80. In other words, the Abbe number is recognized not as blur or density as manifested by the Snellen's E mark 72, but as the area of the region marked out with and contained in the circle, the ellipse or the closed curve whose center is at the optical center O. The closed curve 82a defining the region of comfortable vision 82 corresponds, in this case, to a spectacle lens that is a progressive multifocal lens.

It is also possible to run the simulation after changing at least one of the Abbe number, the visual acuity value, the spherical dioptric power, the cylindrical dioptric power, the angle of cylindrical axis, the additional dioptric power and the values of IN/OUT and UP/DOWN of the region of comfortable vision 82 on the spectacle lens. Each simulation calculates the corresponding region of comfortable vision based upon the values of the inputted data and displays the results in the right area of the screen window 50 for the person who will be wearing the spectacle lens, so that person can appreciate what the simulated changes might be like. It is also possible that desired values of the Abbe number, the value of visual acuity, the spherical dioptric power, the cylindrical dioptric power, the angle of cylindrical axis, the additional dioptric power and the values of IN/OUT and UP/DOWN are entered and a simulation subsequently run to demonstrate what the desired simulated conditions can produce.

As described above, regions of comfortable vision 82 based on various data can be displayed. It is possible that a region of comfortable vision 81 based on a specific Abbe number is stored as a reference region. Then, this reference region 81 and a region of comfortable vision 82, based on another Abbe number input data set, are displayed on the same screen window 50 and visually compared with each other.

Figure 2:
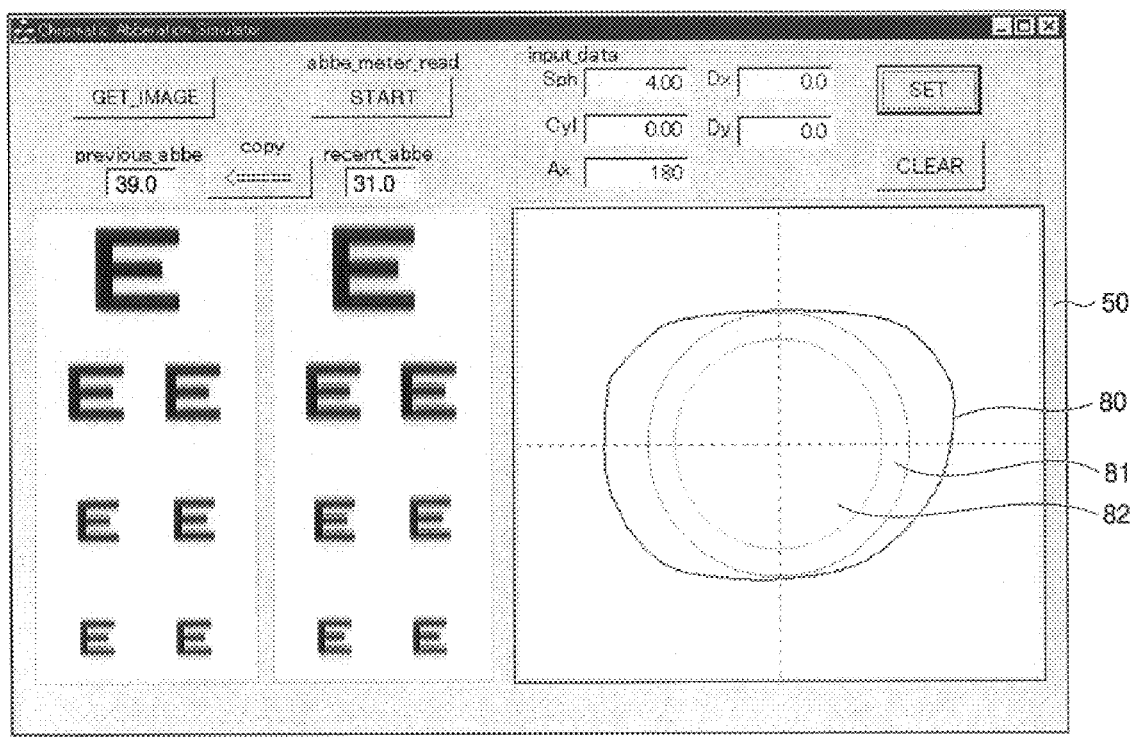
FIG. 2 shows a screen display when the Abbe numbers treated by the apparatus for evaluation of an ocular optical lens in accordance with an embodiment of the present invention are different to an intermediate degree.
Figure 3:
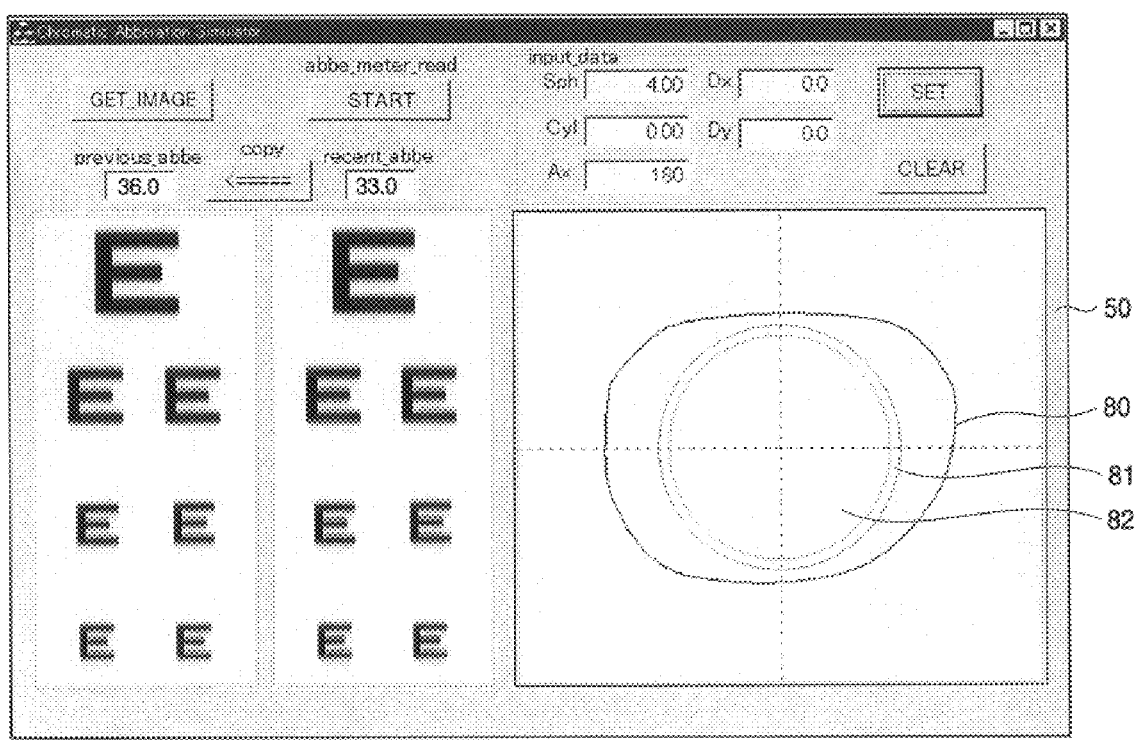
FIG. 3 shows a screen display when the Abbe numbers treated by the apparatus for evaluation of an ocular optical lens in accordance with an embodiment of the present invention are different to a small degree.

It is clear from the previous description and FIGS. 1–3 that when a single region of comfortable vision is displayed on the screen window 50 that a layperson can easily evaluate the performance of a spectacle lens having selected characteristics. Furthermore, when a plurality of different regions of comfortable vision corresponding to lenses having different selected characteristics are displayed and compared, a layperson can easily evaluate the performance of the different spectacle lenses. This comparative feature of the invention facilitates the selection of a more excellent spectacle lens from among a group of possible spectacle lenses that are based on different specifications.

When the GET_IMAGE button 52 is clicked, the Abbe number and the image of actual vision of the Snelen's E mark 72 which are displayed at that time on the right portion B of the left area are saved and transferred to the left portion A of the left area of the screen. The region of comfortable vision 81 remains in the right area. When the GET_IMAGE button 52 is not clicked, the data in the Recent_Abbe window 61, the image of actual vision 72 and the image of the region of comfortable vision 82 are overwritten by new data and a new image is updated every time the new data are set.

When the image of actual vision 71 based on the Abbe number displayed on the Previous_Abbe window 61 is saved and a new Abbe number subsequently set in the Recent_Abbe window 62, an image of actual vision 72 based on the new Abbe number is displayed in the right portion B of the left area of the screen. In the right area C of the screen, a Recent region of comfortable vision 82 is displayed as an image overlapping the image of the Previous region of comfortable vision 81. Therefore, the images of actual vision 71 and 72, based on the corresponding Abbe numbers, are displayed simultaneously with the corresponding regions of comfortable vision 81 and 82 respectively. The displayed image of actual vision 71 is transferred from the present portion B to the adjacent portion A for comparison and a plurality of images of actual vision are displayed in this portion so that the images of actual vision can be compared also with the image of actual vision 72 which will be displayed afterwards in portion B.

The regions of comfortable vision 81 and 82 are displayed in the region surrounded by the image of the shape of the spectacle frame 80 as two concentric circles 81a and 82a corresponding to the two different Abbe numbers. The centers of the concentric circles 81a and 82a are placed at the center of the spectacle frame image 80 in the example shown in FIG. 1 for illustrative convenience. However, in the practice of the invention the center of each concentric circle is actually placed at the optical center of the lens being evaluated. The difference between the two images of actual vision 71 and 72, which are based on different Abbe numbers and displayed in the portions A and B respectively of the left area of the screen, cannot be easily visually recognized. In contrast, the difference between the two regions of comfortable vision 81 and 82, which are based on different Abbe numbers, and displayed in the right area of the screen is a way to express the differences that can be easily recognized. In other words, the effect of the lens Abbe number on the Snellen E mark visual images 71 and 72 are subtle and difficult to appreciate; however, the effect of the lens Abbe number on the regions 81 and 82 is plain. Therefore, a person merely has to look at the two regions 81 and 82 to visually appreciate how different Abbe numbers affect lenses.

This feature is clearly shown in FIG. 1 by the two concentric circles 81a and 82a respectively illustrated by using a full line and a broken line for convenience. It is preferable in the actual operation of the apparatus that the two circles are distinguished from each other by using different colors. For example, when the Previous_Abbe window 61 and the Recent_Abbe window 62 have red color and blue color, respectively, and the two circles 81a and 82a have red color and blue color, respectively, in correspondence to the colors of the windows, the comparison is facilitated and easily understood, and the difference in visibility arising from the difference in the Abbe number of the spectacle lens can be evaluated and appreciated easily.

It is noted that FIG. 1 illustrates how spectacle lenses having Abbe numbers relatively greatly different from each other are visually compared (difference in Abbe number is 13). In FIG. 2, spectacle lenses having Abbe numbers closer to each other i.e., 39.0 and 31.0 respectively) having an intermediate difference between Abbe numbers of 8.0 are visually compared. In FIG. 3, spectacle lenses having Abbe numbers closer to each other (i.e., 36.0 and 33.0 respectively) with the difference in the Abbe numbers of only 3.0 are visually compared. As these figures show, by displaying the region of comfortable vision, being an area wherein a specific visual acuity is surely obtained, that is based on the Abbe number of the lens as the area of a circle, an ellipse or a closed curve as shown in the embodiments of the present invention, a clear visual representation of the difference in vision due to differences in the Abbe number achieved. Furthermore, the method and apparatus of the present invention provides a clear visual representation of the Abbe number differences even when the difference in the Abbe number is relatively small.

In summary, the difference in the visual acuity of an image due to the difference in the Abbe number of the lens is displayed not by the simulation of a retinal image containing chromatic aberration in the actual use of a spectacle lens, but by a simulation expressing the difference as the area of the region of comfortable vision in which the specific visual acuity is surely obtained as seen within the image of the shape of a spectacle frame. Therefore, the difference in the Abbe number can be directly and clearly recognized visually from the difference in the area of the regions of comfortable vision. Consequently, the difference in the Abbe number of spectacle lenses can be appreciated by a layperson who will be wearing the spectacle lens, and the difference in the performance of the spectacle lens can be clearly recognized. Moreover, regions of comfortable vision representing spectacle lens having different specifications, such as for the Abbe number, can be displayed as overlapping images on the same screen, thereby facilitating a visual comparative evaluation with respect to the difference in vision achieved due to the difference in the Abbe number. As a result, the Abbe number, which is not otherwise easily appreciated by a layperson wearing the spectacle lens, can now be appreciated more easily.

Since the center of the circle, the ellipse or the closed curve forming the outline of the region of comfortable vision is placed at the optical center of the spectacle lens, a layperson can appreciate the area of the region of comfortable vision and the range of the region in which the specific value of visual acuity is surely obtained.

In one of the preferred embodiments of the present invention, the region of comfortable vision corresponding to a desired visual acuity is obtained for one spectacle lens based on the Abbe number at each point of the spectacle lens. Then, the region of comfortable vision corresponding to the degree of desired visual acuity is obtained in another and different spectacle lens, and the two regions are displayed on the same screen and visually compared.

In another embodiment of the invention, a point may be selected arbitrarily inside the lens shape; then, based on the prism characteristics of the selected point, a region of comfortable vision may be calculated for the one spectacle lens so that a specific value of visual acuity can be surely obtained at the selected point. Thereafter, a similar region of comfortable vision for another spectacle lens, having the same value of visual acuity as the region of comfortable vision of the first lens, may be calculated. Subsequently, the two visual regions are displayed on the same screen and visually compared. In this embodiment, it is preferable that an image of actual vision at the selected point be created and displayed on the same screen as the two visual regions so that the image can be compared with the corresponding visual region.

One limitation of the simulation method and apparatus of the present invention is that only the lateral chromatic aberration in magnification is considered, whereas the spherical aberration, the coma aberration and the astigmatism are not directly considered for simplifying the calculation. Furthermore, it is pointed out that the lateral chromatic aberration in magnification effect is not accounted for by using a rigorous method of ray tracing, but is addressed by using an approximate equation calculation that assumes that the angle of deviation of a ray is proportional to the prism diopter. For all practical purposes, the above approximate method is sufficient because the object of facilitating the understanding of a person wearing a spectacle lens still is achieved. However, it is possible to provide a highly accurate simulation that is more detailed by using the method of the present invention and by considering data corresponding to the optical system which have not considered in the present invention. In other words, it is within the skill of one of ordinary skill in the art to perform a more detailed simulation calculation without deviating from the scope and spirit of the invention.

Although the above method and apparatus is directed to evaluating an optical system consisting of a spectacle lens as the optical lens, it is clear that the method and apparatus can be used for evaluating and selecting an optical system consisting of a contact lens or an in-eye lens (surgically implanted, intra-ocular lens). It is also possible that the method and apparatus of the present invention can be practiced by substituting the scenery image of a Landolt's ring as the image of actual vision in place of the Snellen's E marks. Furthermore, the layout of the display or of the display screen window is not limited to those shown in the embodiments evinced herein, and can be changed in various manners, so long as the object of the present invention is not adversely affected. The number of images simultaneously shown on the screen is not limited to one or two images but may be three or more.

Therefore, the preferred embodiments disclosed above should be considered illustrative of the spirit of the invention and not taken to be limiting. One of ordinary skill in the art will recognize that additions, deletions, substitutions and improvements can be made while remaining within the scope and spirit of the present invention as defined by the appended claims.

What is claimed is:

1. A method for evaluating an ocular optical lens comprising steps of:
   inputting a first value of an Abbe number for expressing a degree of chromatic aberration at each point on a first ocular optical lens;
   generating first output data from the first Abbe number value, wherein the first output data comprises a region of comfortable vision corresponding to a specific value of visual acuity; and
   outputting the first output data to a data output, thereby facilitating an evaluation of the first ocular optical lens.

2. A method for evaluating an ocular optical lens according to claim 1, wherein the step of outputting includes displaying the region of comfortable vision as an image.

3. A method for evaluating an ocular optical lens according to claim 1 or 2, wherein the region of comfortable vision comprises a region marked out with and contained in a circle, an ellipse or a closed curve.

4. A method for evaluating an ocular optical lens according to claim 2, wherein the displaying step displays the region of comfortable vision and an image of the ocular optical lens on a screen, with a center of the region placed at an optical center of the image of the ocular optical lens, wherein the image of the ocular optical lens is displayed as a lens frame.

5. A method for evaluating an ocular optical lens according to claim 2, further comprising the step of:
   creating a first image of actual vision corresponding to the first region of comfortable vision and based on the Abbe number value used for generating the first region of comfortable vision, wherein the displaying step includes displaying the first image of actual vision and the first region of comfortable vision on a single screen so that the first image and the first region can be compared.

6. A method for evaluating an ocular optical lens according to claim 5, wherein a Landolt's ring or a Snellen's visual mark is used to create the first image of actual vision.

7. A method for evaluating an ocular optical lens according to claim 1, further comprising:
   inputting a second value of an Abbe number for expressing a degree of chromatic aberration at each point on a second ocular optical lens;
   generating second output data wherein the second output data comprises a plurality of regions of comfortable vision corresponding to the specific value of visual acuity; and
   outputting the second output data to the data output, thereby facilitating an evaluation of the first and second ocular optical lenses.

8. A method for evaluating an ocular optical lens according to claim 7, wherein the step of outputting the second output data includes displaying a plurality of regions of comfortable vision as images on a single screen so that the plurality of regions of comfortable vision can be compared.

9. A method for evaluating an ocular optical lens according to claim 8, wherein each region of comfortable vision of the plurality of regions of comfortable vision comprises a region marked out with and contained in a circle, an ellipse or a closed curve.

10. A method for evaluating an ocular optical lens according to claim 8, wherein the displaying step displays the plurality of regions of comfortable vision and an image of the ocular optical lens on the single screen, with a center of each region of the plurality of regions of comfortable vision placed at an optical center of the image of the ocular optical lens, wherein the image of the ocular optical lens is displayed as a lens frame.

11. A method for evaluating an ocular optical lens according to claim 1, further comprising the steps of:

inputting values corresponding to at least one of a value of visual acuity, a spherical dioptric power, a cylindrical dioptric power, an angle of cylinder axis, an additional dioptric power, and values of IN/OUT and UP/DOWN corresponding to a lens shape; and simulating a change in the region of comfortable vision corresponding to a change in at least one of the Abbe number, the value of visual acuity, the spherical dioptric power, the cylindrical dioptric power, the angle of cylinder axis, the additional dioptric power and the values of IN/OUT and UP/DOWN.

12. A method for evaluating an ocular optical lens comprising steps of:

arbitrarily selecting a first point corresponding to an inside of a lens shape of a first ocular optical lens, and, based on prism characteristics at the selected first point, generating a corresponding first visual region in which a specific first value of visual acuity is obtained;

deliberately selecting a second point corresponding to an inside of a lens shape of a second ocular optical lens wherein the second point is selected to be equivalent to the first point, and, based on prism characteristics at the selected second point, generating a corresponding second visual region in which a specific second value of visual acuity is obtained; and displaying the first visual region and the second visual region on a single screen so that the first and second regions can be compared.

13. A method for evaluating an ocular optical lens according to claim 12, further comprising steps of:

creating a first image of actual vision at the selected first point; and displaying the first image of actual vision and the first visual region on a single screen so that the first image and the first visual region can be compared.

14. An apparatus for evaluating an ocular optical lens, the apparatus comprising:

a data input for inputting data of an optical system, said data including an Abbe number, a lens dioptric power, a value of visual acuity, and a lens shape of an ocular optical lens;

means for calculating a region of comfortable vision based on data inputted via the data input, wherein the region of comfortable vision is a region in which a desired value of visual acuity is obtained; and a display connected to display both the region of comfortable vision and the lens shape on a single screen so that the region of comfortable vision and the lens shape can be compared.

15. An apparatus for evaluating an ocular optical lens according to claim 14, wherein the region of comfortable vision is marked out with and contained in a circle whose center is placed at an optical center of the ocular optical lens and whose radius has a value h in a following range:

$$h \leq k v_e / |D|$$

wherein k is a constant, $v_e$ is an Abbe number, and

D is a lens dioptric power.

16. An apparatus for evaluating an ocular optical lens according to claim 14 or 15, which further comprises:

an apparatus to measure the Abbe number of the ocular optical lens;

a lens meter to measure a lens dioptric power of the ocular optical lens;

a frame tracer to obtain data corresponding to a shape of a lens frame;

an external input connected to input data obtained by the apparatus for measuring an Abbe number, the lens meter and the frame tracer into the means of calculation; and a manual input connected to input data, including the Abbe number corresponding to a preferred optical system, into the means for calculating.

17. A memory medium readable by a computer and comprising a stored program for operating a computer, the program comprising:

means for entering and processing data corresponding to an optical system of an ocular optical lens;

means for generating a region of comfortable vision based on data entered and processed by the means for entering and processing data, wherein the region of comfortable vision corresponds to a specific value of visual acuity; and means for displaying the region of comfortable vision generated by the means for generating.

18. A memory medium readable by a computer according to claim 17, wherein the region of comfortable vision is marked out and contained in a circle whose radius is calculated, based on the data entered, by the means for generating to have a radius value h defined by the relationship $$h \leq k v_e / |D|$$

wherein k is a constant, $v_e$ is an Abbe number, and

D is a lens dioptric power.

* * * * *